1,008,134. PROJECTION APPARATUS.
Emory W. Goodrich, Somerville, Mass.
Filed Jan. 14, 1909. Serial No. 472,259.

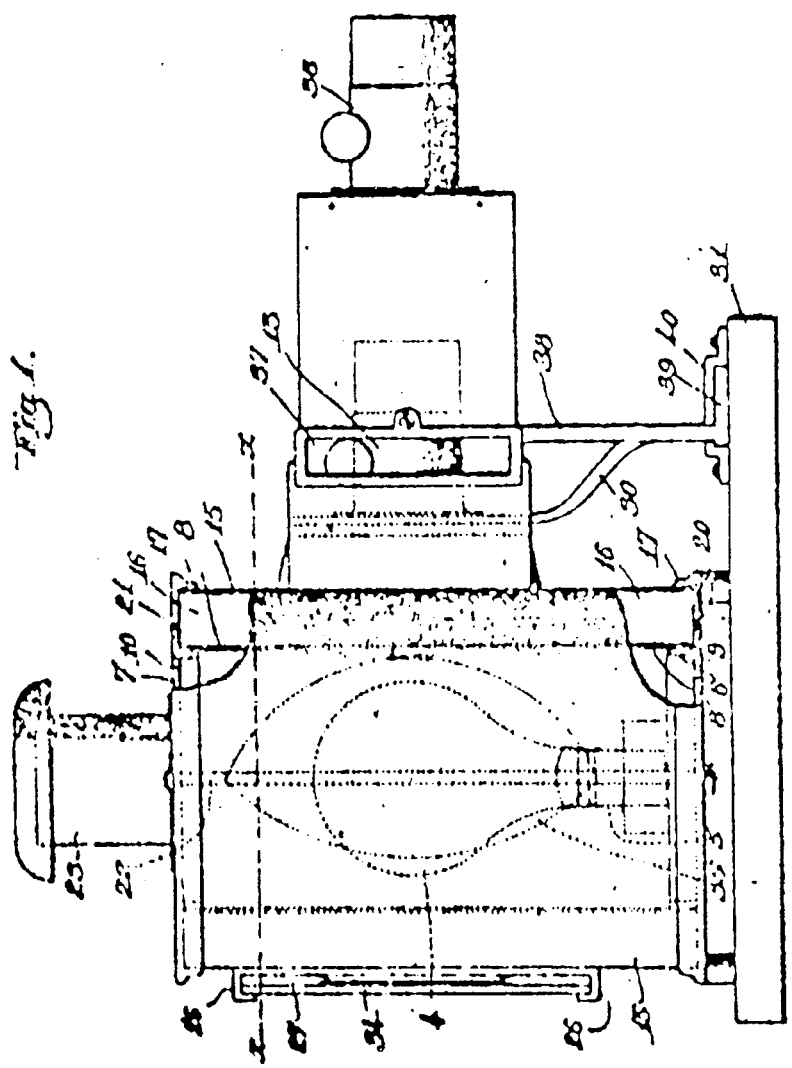

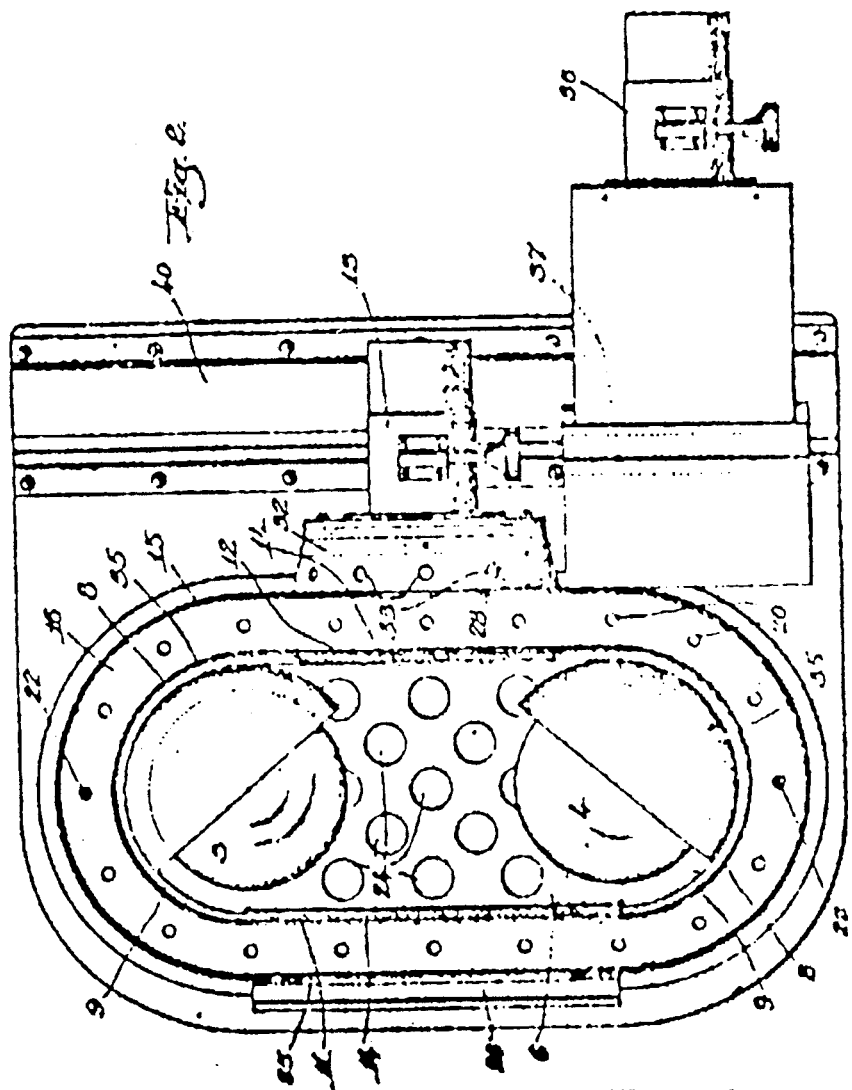

*To all whom it may concern:*

Be it known that I, EMORY W. GOODRICH, a citizen of the United States, residing at Somerville, county of Middlesex, State of Massachusetts, have invented an Improvement in Projection Apparatus, of which the following description, in connection with the accompanying drawing, is a specification, like letters on the drawing representing like parts.

This invention relates to projection apparatus and has for its principal object to provide a novel projection apparatus which is capable of being used for both opaque and transparent projection work, and which is very compact in its construction and is therefore especially applicable for use in homes and small halls where it would be inconvenient to use the larger and more elaborate devices that are customarily employed for both opaque and transparent projection work.

The apparatus herein shown is especially designed for using an incandescent electric light as the source of illumination, although the invention is not necessarily limited to the use of a light of this character.

In order to avoid confusion I will hereinafter refer to the source of illumination as the lamp, but by the use of this expression I do not wish to be limited to any particular style of lamp.

The desired compactness and small size of the device is secured by making the chamber containing the lamp or lamps only a little larger than is necessary to receive the lamps and by providing two opposed walls of the chamber with openings, one of which is situated in line with the objective and the other of which is situated in line with a holder adapted to hold either an opaque object or a mirror, depending on whether the device is to be used for opaque projection work or transparent projection work. When the device is used for opaque projection work the light rays from the lamps are directed through the latter opening onto the object and illuminate it, and the light rays emanating from the illumined object are directed across the lamp-receiving chamber through the opening in the opposite wall and into the objective. When the device is used for transparent projection work and a mirror is placed in the holder, then the light rays from the lamps will be reflected by the mirror through the opening, which is in line with the objective, and onto the transparency.

Since the lamp-receiving chamber is small the heat of the lamp tends to heat the walls thereof to such an extent that it is difficult to handle the apparatus conveniently. To obviate this I have provided an arrangement for ventilating the chamber containing the lamp and have also provided the lamp house with double walls which form between them an air space which is provided with ventilating openings leading into the top and bottom thereof so that a current of air will be continuously passing up through said air space and will thus carry away by convection the heat radiating from the inner wall. In this way the outer or exterior wall is kept sufficiently cool so that the lamp can be readily handled. I have also provided a novel construction for protecting the object, or the mirror, and also the objective from the heat of the lamp.

In the drawings wherein I have illustrated a selected embodiment of my invention which is sufficient to give a proper understanding of the principle thereof, Figure 1 is a side view of such an apparatus with a portion of the lamp house broken out; Fig. 2 is a section on the line x—x, Fig. 1.

In the present embodiment of my invention I have shown two lamps which are designated 3 and 4, although it would be within my invention to use a single lamp. These lamps are shown as incandescent lamps and are supported in suitable sockets 5 sustained on the bottom plate 6 of the lamp house. The chamber for receiving the lamps is shown as being formed by the bottom and top plates 6 and 7, and the side wall 8 which may conveniently be of sheet metal. The bottom and top plates are shown as provided with flanges 9 and 10 against which the sheet metal wall rests. Where the two lamps are used, the chamber receiving the lamps is preferably oblong in shape, as seen in Fig. 2, and the lamps will be placed at opposite ends of the chamber. One side of the chamber is formed with an opening 11 in line with the opaque object and the opposite side is provided with an opening 12 in line with the objective 13. These openings are preferably closed by pieces of thick glass 14, or other transparent material which are for the purpose of confining as far as possible the heat of the lamps within the walls 8. There will, of course, be considerable heat developed by the lamps and to prevent the exterior of the lamp house from becoming too hot, I have made the lamp house with an air space surrounding the wall 8. This is accomplished by providing the exterior wall 15 which is spaced from the interior wall 8 so as to leave the air space 16. This exterior wall 15 may conveniently be held in place by flanges or ribs 17 formed on the top and bottom plates. Said plates are also provided with ventilating openings 21 and 20 leading to the air space 16, so that when the device is in use, the air within the air space will when heated rise and escape through the upper openings 21, while cool air will be admitted to the air space through the lower openings 20. In this way a constant current of air is passing through the air space which will carry away by convection the heat which radiates from the heated walls 8 and thus prevents the outer wall 15 from becoming unduly heated.

I have herein shown the top and bottom plates of the lamp house as being held together by bolts 22 which extend through both plates. The upper plate 7 is also provided with a chimney 23 of usual construction, and the bottom plate may be provided with openings 24 leading into the space within the walls 8, and thus a current of air will be constantly circulating through the space which receives the lamps. A lamp house having this construction is very simple and inexpensive to manufacture and the exterior wall thereof will not become unduly heated because of the manner of ventilating.

The outer wall 15 is provided with an opening 25 in line with the opening 11 in the inner wall, and a holder 26 for a card or other opaque object is provided for holding said object opposite the opening 25. This holder 26 may conveniently be secured directly to the wall 15, although such construction is not essential, and it is shown as comprising two flanges between which a card holder 27 may be slipped. The opposite side of the wall 15 is provided with an opening 28 in line with the opening 12 through the wall 8.

The objective 13 may have any suitable or usual construction and may be sustained in any appropriate way. I have herein shown it as sustained by a bracket 30 which in turn is supported by the base 31 on which the lamp house is adapted to rest. In order to protect the objective from the heat of the lamp I propose to associate with it a ventilating chamber 32, the walls of which are provided with ventilating openings 33 so that a cooling current of air may pass through this chamber.

In using the device for opaque projection work the card 34 or other opaque object is placed in the card holder 27 and the latter is placed in the holder 26. The light rays from the lamps 3 and 4 are directed through the openings 11 and 25 onto the object and thus illuminate it, and the light rays emanating from the illumined object pass in between the lamps 3 and 4 through the openings 12 and 28 to the objective by which they are projected onto the screen in usual manner.

In order to increase the illuminating power of the lamps I may provide them with reflectors 35 situated to reflect the light rays onto the object 34.

In order to convert the device into one for projecting transparencies, I place a mirror or a reflector in the holder 26 and substitute another objective 36 suitable for transparent work for the objective 13, said objective 36 having associated therewith a holder 37 for the transparencies. In order to facilitate this substitution, it is convenient to mount the objective 36 on a standard 38 which is provided with a shoe 39 running in ways 40 sustained by the base plate 31, and said shoe 39 may be made rigid with or integral with the bracket 30 sustaining the objective 13. This construction permits the two objectives to be moved simultaneously and by shifting the position of the shoe 39, either one may be brought in line with the aperture 28.

It will be seen from the above that my apparatus is extremely simple, can be manufactured at a small cost, and occupies a very small space.

The invention is not confined to the constructional details illustrated, although the drawings show the preferred embodiment of the invention.

Having fully described my invention, what I claim as new and desire to secure by Letters Patent is:—

1. In a projection apparatus, the combination with a lamp house comprising upper and lower plates and inner and outer walls situated between said plates and forming between them an air space, said plates having apertures leading to said air space, of a lamp in said house, an objective, and a ventilated chamber situated between the objective and the lamp house.

2. In a projection apparatus, the combination with a lamp house having top and bottom plates and inner and outer walls situated between said plates and forming between them an air space, said plates having apertures leading to the air space and the walls of said lamp house having openings on opposite sides, of a lamp situated within said interior wall and adapted to direct its light rays through one opening, a holder adjacent said opening, an objective situated in line with the other opening, and a ventilated chamber associated with the objective and situated between the latter and the lamp house.

3. In a projection apparatus, the combination with a lamp house comprising upper and lower plates and inner and outer walls situated between said plates and forming between them an air space, said plates having apertures leading to said air space, of a lamp in said house, and an objective.

4. In a projection apparatus, the combination with a lamp house comprising upper and lower plates and inner and outer walls situated between said plates and forming between them an air space, each plate having apertures leading to said air space whereby a cooling current of air will pass up through said air space, and bolts extending through said plates for holding them together, of a lamp in said house, and an objective.

5. In a projection apparatus, the combination with a lamp-receiving chamber having two opposed openings, of a lamp situated within said chamber and adapted to direct its light rays toward one opening, a holder adjacent said opening, two objectives movably mounted so that either may be brought in line with the other opening, and a ventilated chamber connected to and movable with one of the objectives and situated between the latter and the lamp-receiving chamber.

In testimony whereof, I have signed my name to this specification, in the presence of two subscribing witnesses.

EMORY W. GOODRICH.

Witnesses:
   LOUIS C. SMITH,
   THOMAS J. DRUMMOND.